US010121291B2

(12) United States Patent
Cuddihy et al.

(10) Patent No.: US 10,121,291 B2
(45) Date of Patent: Nov. 6, 2018

(54) METHOD AND APPARATUS FOR VISUAL ACCIDENT DETAIL REPORTING

(71) Applicant: Ford Global Technologies, LLC, Dearborn, MI (US)

(72) Inventors: Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 803 days.

(21) Appl. No.: 14/065,666

(22) Filed: Oct. 29, 2013

(65) Prior Publication Data

US 2015/0120082 A1 Apr. 30, 2015

(51) Int. Cl.
*H04W 4/12* (2009.01)
*G07C 5/12* (2006.01)
*G07C 5/00* (2006.01)
*G07C 5/08* (2006.01)

(52) U.S. Cl.
CPC ............. *G07C 5/008* (2013.01); *G07C 5/085* (2013.01); *G07C 5/0825* (2013.01)

(58) Field of Classification Search
CPC ....... G08B 25/08; G08B 25/001; G08G 1/205
USPC ..... 701/45, 301, 46, 31.4; 455/404.1, 414.1, 455/404.2
See application file for complete search history.

(56) References Cited

U.S. PATENT DOCUMENTS

| | | | | |
|---|---|---|---|---|
| 6,076,028 A * | 6/2000 | Donnelly | B60R 21/013 | 701/45 |
| 6,085,151 A * | 7/2000 | Farmer | G01S 7/023 | 342/70 |
| 6,097,998 A * | 8/2000 | Lancki | G01L 5/28 | 701/34.3 |
| 7,313,467 B2 * | 12/2007 | Breed | G07C 5/008 | 307/9.1 |
| 7,508,298 B2 * | 3/2009 | Pisz | G08B 25/001 | 340/436 |
| 7,580,782 B2 * | 8/2009 | Breed | B60R 21/013 | 280/728.1 |
| 7,650,210 B2 * | 1/2010 | Breed | B60W 50/0205 | 701/29.1 |
| 7,671,762 B2 * | 3/2010 | Breslau | G08G 1/205 | 340/10.42 |
| 8,260,489 B2 * | 9/2012 | Nielsen | G07C 5/085 | 701/32.2 |
| 8,744,412 B1 * | 6/2014 | Cazanas | H04W 4/12 | 455/412.1 |
| 8,930,040 B2 * | 1/2015 | Gompert | G07C 5/008 | 701/1 |
| 9,008,906 B2 * | 4/2015 | Ricci | G06F 17/00 | 180/232 |
| 9,187,013 B2 * | 11/2015 | Helm | B60N 2/002 | |

(Continued)

*Primary Examiner* — Thomas G Black
*Assistant Examiner* — Wae L Louie
(74) *Attorney, Agent, or Firm* — Jennifer Stec; Brooks Kushman P.C.

(57) ABSTRACT

A system includes a processor configured to request vehicle sensor data upon crash detection. Further, the processor is configured to assemble the data into a graphic representation of a vehicle, including graphic representations of conditions represented by sensor data. The processor is also configured to send the graphic representation to an emergency operator in communication with a vehicle computing system.

21 Claims, 4 Drawing Sheets

(56) References Cited

U.S. PATENT DOCUMENTS 9,226,124 B2 * 12/2015 Schuler .................. H04N 7/181
9,317,983 B2 * 4/2016 Ricci ...................... H04W 4/21
9,384,491 B1 * 7/2016 Briggs .................. G08G 1/205
9,674,370 B2 * 6/2017 Kim ...................... H04M 11/04
2002/0082806 A1 * 6/2002 Kaub .................. G08G 1/0104 702/182
2005/0030224 A1 * 2/2005 Koch .................. G01S 5/0027 342/357.31
2008/0042815 A1 * 2/2008 Breed .................. B60N 2/2863 340/435
2008/0106439 A1 * 5/2008 Breslau .................. G08G 1/205 340/988
2009/0002145 A1 * 1/2009 Berry .................. G08G 1/205 340/436
2009/0186596 A1 * 7/2009 Kaltsukis ............... G08B 25/08 455/404.2
2009/0268947 A1 * 10/2009 Schaufler ........... G06K 9/00805 382/104
2010/0039216 A1 * 2/2010 Knight .................. G01S 5/0027 340/5.1
2010/0257250 A1 * 10/2010 Salafia ............. H04M 3/42068 709/206
2010/0261492 A1 * 10/2010 Salafia ............. H04M 3/42068 455/466
2011/0028128 A1 * 2/2011 Cazanas ............. H04N 7/17327 455/414.1
2012/0094628 A1 * 4/2012 Mader .................... G08G 1/205 455/404.1
2013/0006469 A1 * 1/2013 Green .................... G07C 5/008 701/36
2014/0002651 A1 * 1/2014 Plante ...................... H04N 5/76 348/148
2015/0097703 A1 * 4/2015 Baur ...................... G08G 1/205 340/902
2015/0120082 A1 * 4/2015 Cuddihy ................ G07C 5/008 701/1
2016/0094964 A1 * 3/2016 Barfield, Jr. ............ H04W 4/22 455/404.2

* cited by examiner

METHOD AND APPARATUS FOR VISUAL ACCIDENT DETAIL REPORTING

TECHNICAL FIELD

The illustrative embodiments generally relates to methods and apparatuses for visual accident detail reporting.

BACKGROUND

Vehicular telematics systems have made connection to emergency operators extremely quick and convenient in the event of an accident. When a vehicle sensor detects an accident condition, a process triggers an automatic call to an emergency operator through a vehicle telematics system. This call often provides verbal communication with the operator, between both the operator and the occupant, and the operator and the vehicle itself.

U.S. Pat. No. 8,260,489 generally relates to geo-referenced and/or time-referenced electronic drawings that may be generated based on electronic vehicle information to facilitate documentation of a vehicle-related event. A symbols library, a collection of geo-referenced images, and any data acquired from one or more vehicles may be stored in memory for use in connection with generation of such drawings, and a drawing tool graphical user interface (GUI) may be provided for electronically processing vehicle data and geo-referenced images. Processed geo-referenced images may be saved as event-specific images, which may be integrated into, for example, an electronic vehicle accident report for accurately depicting a vehicle accident.

U.S. Patent Application 2009/0002145 generally relates to a method and apparatus for notifying an emergency responder of a vehicle emergency. Communication is established with a cellular telephone located within the vehicle. The communication link is monitored and the vehicle occupant is notified of link loss. The apparatus monitors vehicle safety systems for detection of an emergency condition. Upon detection, the occupant is notified that an emergency call will be made. If no cancellation is received, vehicle location information is obtained from a global position system, synthesized into voice signals, and communicated to an emergency responder using the cellular telephone. A plurality of occupant and vehicle emergency information may also be provided. Emergency responders may be provided with a touch tone menu to select among the available information. Vehicle and occupant information may be communicated to the apparatus from external sources, such as a web server database via cellular telephone connection, or removable memory.

SUMMARY

In a first illustrative embodiment, a system includes a processor configured to request vehicle sensor data upon crash detection. Further, the processor is configured to assemble the data into a graphic representation of a vehicle, including graphic representations of conditions represented by sensor data. The processor is also configured to send the graphic representation to an emergency operator in communication with a vehicle computing system.

In a second illustrative embodiment, a computer implemented method includes requesting vehicle sensor data upon crash detection. The method also includes assembling the data into a graphic representation of a vehicle, including graphic representations of conditions represented by sensor data. The method further includes sending the graphic representation to an emergency operator in communication with a vehicle computing system.

In a third illustrative embodiment, a system includes a processor configured to gather crash-related vehicle data. The processor is also configured to assemble the crash-related data into a graphical representation of a vehicle. Also, the processor is configured to determine exacerbated crash conditions, which may require specialized emergency services, from the gathered crash-related data. Further, the processor is configured to request additional data related to any exacerbated crash conditions and incorporate the additional data into the graphical representation, including a graphical indicia indicating the presence of an exacerbated condition.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
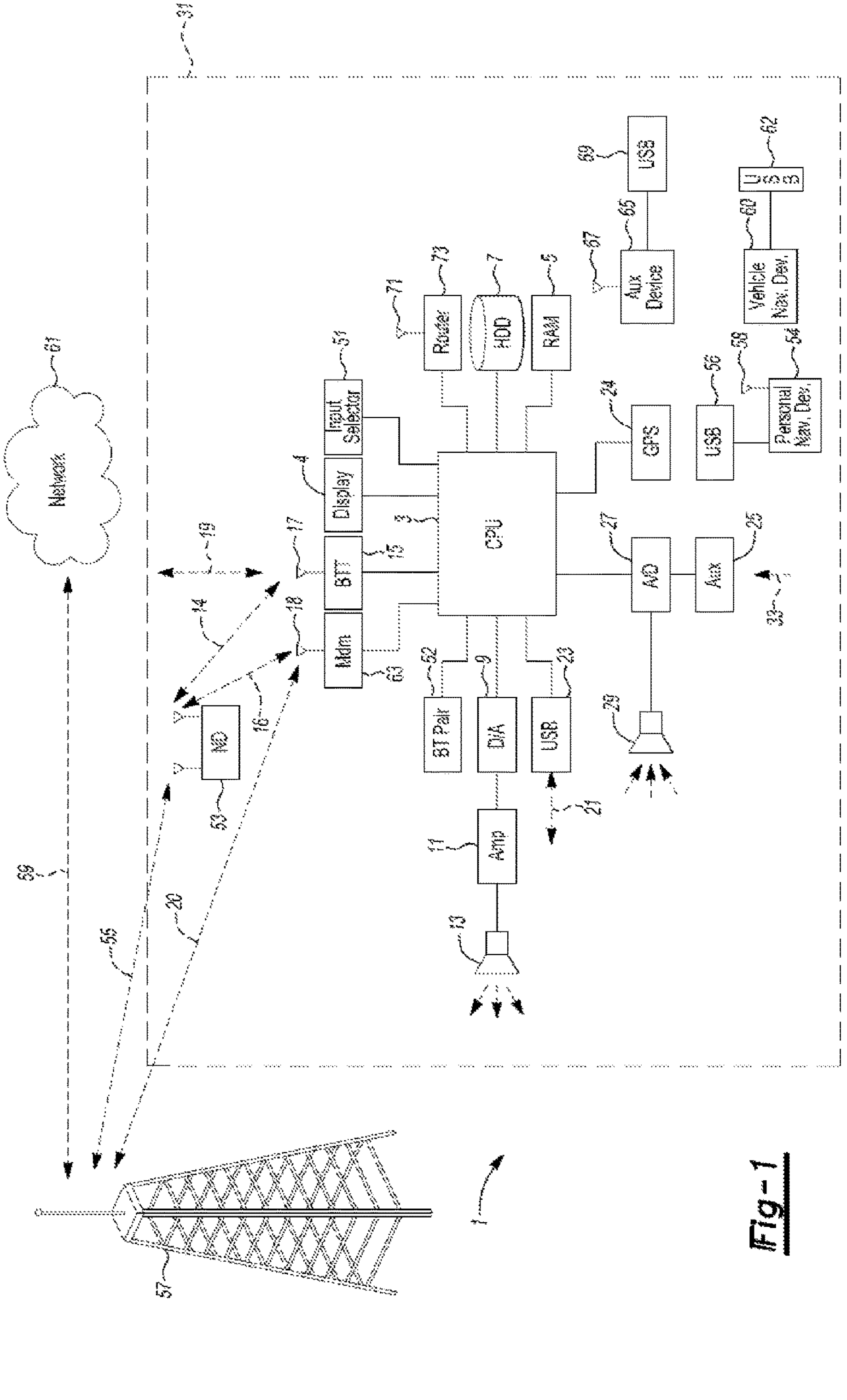
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments describe methods and apparatuses for sending visual data directly to 911 using a customer's phone. They use any mobile device which can be linked with a VCS using the existing BLUETOOTH interface or other wireless interface.

In one illustrative example, the system consists of two software modules, one which resides in the vehicle, which transmits the information to the driver's phone in the case of a crash, and another software module which runs on the driver's wireless device. The application receives the data through a wireless VCS connection, attaches it to an email message (or other suitable format), and sends it through the customer's email account to an emergency operator as a text message.

Figure 3:
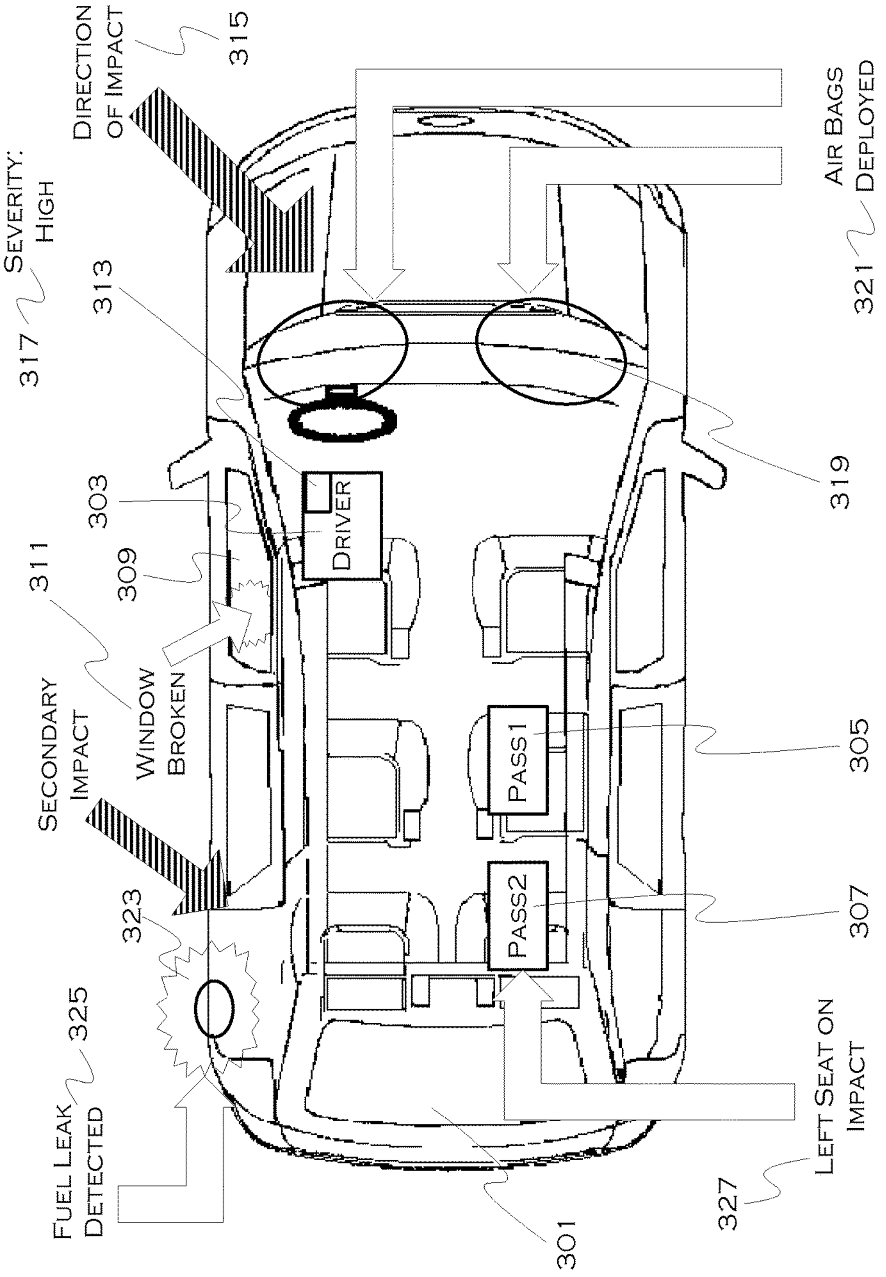
FIG. 3 shows an illustrative example of a graphic crash detail report.

Emergency call centers in the US are currently being updated to accept text messages, and the process has already started at a number of call centers across the country. This can be leveraged to send data from the vehicle. The text message can include a photo and/or graphic to display the data, an example of which is shown in FIG. 3.

This improves the readability for the 911 operator as opposed to an ASCII text message, which is unformatted. The graphic can display information about the crash such as number of bags deployed, an indication of severity, Primary direction of force of the crash, whether the vehicle rolled over, etc. It can be modified to accept any new information that is provided by other sensors/systems that may be incorporated in the future, without changing the software on the phone or the emergency system.

The system may be initiated by a crash detection module, which detects a crash and sends out an event notification signal on the vehicle CAN bus. The VCS module receives the message, requests the crash data (severity, buckle status, etc.) from the crash detection module, and optionally requests photo data from a wide angle camera.

Once the requested data is received by the VCS module, it is assembled into graphic form and superimposed on the base vehicle graphic. This graphic, along with an optional picture, is sent to the driver's properly paired wireless device via wireless communication. The app on the driver's wireless device then attaches the data to an email, and sends it to the emergency operator as a SMS text message, for example, with attached graphic, using the driver's cell phone carrier. This information can be used by the call center to improve response. For example, if the system shows a large number of occupants in a severe crash, multiple ambulances can perform the initial response. In this manner, an emergency reporting system can be enhanced by sending visual crash information directly to an emergency operator using a driver's wireless device.

Figure 2:
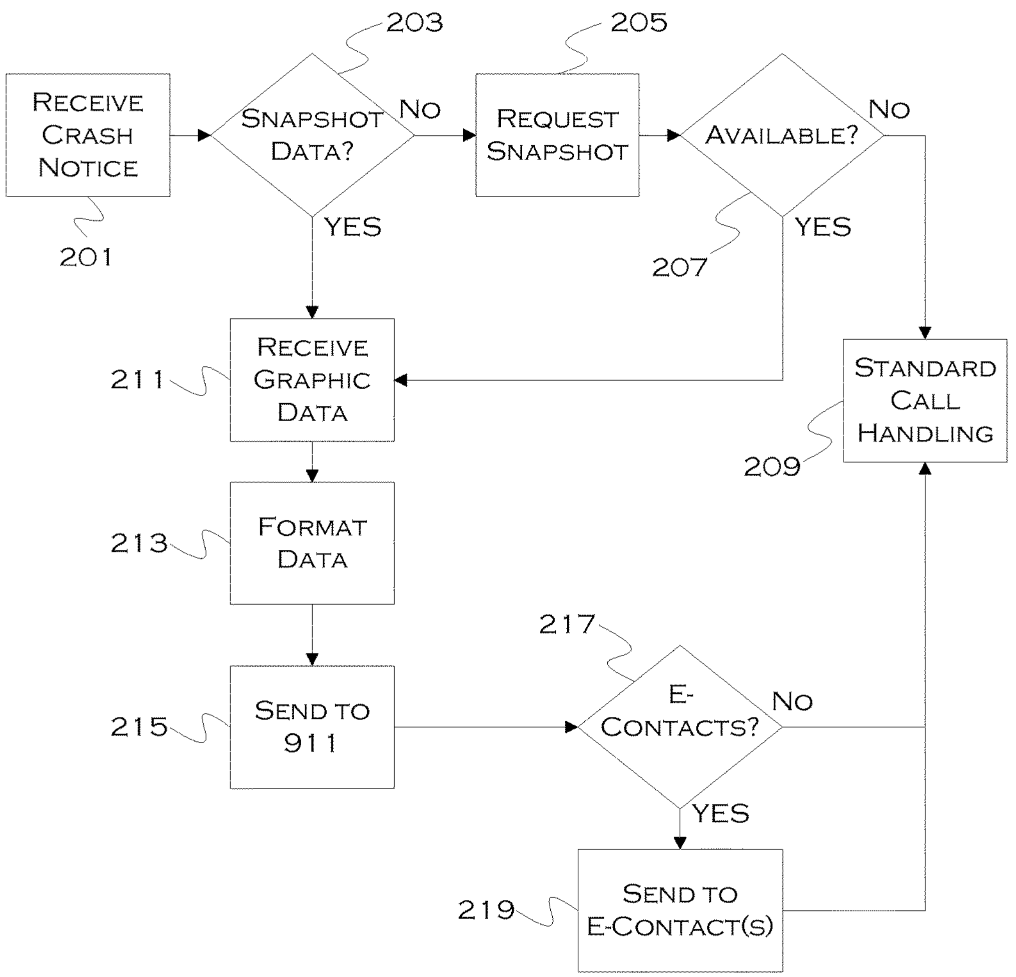
FIG. 2 shows an illustrative process for data handling.

FIG. 2 shows an illustrative process for data handling. In this illustrative example, a vehicle containing an illustrative reporting module is involved in an accident. The process receives a crash notification 201, from a restraint control module (RCM) or other appropriate module for accident sensor reporting. In this embodiment, the process determines whether or not a current snapshot, usable to create a graphic depiction of the crash, exists in memory 203.

If there is no currently existing snapshot, or data to create a graphic rendering, the process will request a snapshot from one or more modules 205 configured to report vehicle status and/or damage. These can include, but are not limited to, air bag deployment sensors, rollover sensors, impact sensors, fluid leak sensors, tire pressure sensors, biometric monitors, vehicle cameras, etc.

The process determines if the requested data is available 207, in some systems the sensors may have been damaged or may otherwise be unavailable. If the requested data is not available, the process proceeds with standard call handling 209 for an emergency situation.

If the data is available 207, or if it was present upon the initial query 203, the process receives data that can be used to create a graphic image of the vehicle 211. This is not a literal photograph of the vehicle, but rather a depiction of the vehicle along with statuses of various vehicle systems and crash-related data that may be useful to first responders. An example of graphic output is shown in FIG. 3.

The data is received and then is processed into graphical format for delivery 213. For example, airbag deployments may be overlaid or otherwise added to a graphic of the vehicle, arrows can show crash impact. Passenger sensors can show occupancy and/or seatbelt status, etc. This data is all formatted into a graphic image 213, and then the image is sent to an emergency operator 215.

In this example, the process also checks to see if there are any non-emergency operator emergency contacts in a phone (e.g., without limitation, in case of emergency (ICE) numbers or otherwise identified contacts). In at least one example, the contacts may have been pre-designated within the vehicle computing system.

If there are any existing emergency contacts 217, the process can also send a copy of the graphic, along with any other relevant information to the emergency contacts. The information can include, for example, location of accident, a perceived severity status, etc.

FIG. 3 shows an illustrative example of a graphic crash detail report. In this illustrative example, a number of exemplary vehicle components and systems, as well as reporting is shown. This is for example purposes only, and is not intended to require all these reports nor to limit the scope of the invention thereto.

In this illustrative example, data from vehicle sensors is compiled into the graphic shown in FIG. 3. The vehicle graphic 301 is augmented with visual representations of this data. Seat occupancy detectors (sensors, cameras, etc.) indicate the presence of a driver 303 and two passengers 305, 307. Even if a passenger has left a seat in the accident, this data may have been logged before the accident and thus can be accurately reported. While most data is more useful when examined post-accident, some data can be logged before the accident depending on the nature of the data. Further, if a passenger was detected pre-impact, and now is absent from a seat, an indicia of "left seat on impact" 327 may be shown.

In another example, window breakage sensors may show the status of windows 309. If a window is broken in the accident, the process may indicate a broken window 311. A plurality of seat belt sensors may also be provided 313. These sensors can help provide visual indication of whether varied occupants did or did not have seat belts fastened upon impact.

A direction of impact 315 may also be shown. This can be determined by a number of systems, including crash sensors, momentum sensors, internal damage to components, vehicle cameras, etc. This can help emergency service providers determine the likely effect of the impact on occupants. A severity of impact may also be indicated, either with text 317 or graphically, such as the brightness, color or size of the impact arrow 315.

Additionally, in this example, airbag deployments are shown 319. This can help first responders determine if occupants were likely protected by airbags during a crash, or if the occupant(s) airbags did not deploy. A textual message may also accompany the deployment indication 321.

A fuel leak is also indicated in this example 323. This could be accompanied by a heat sensor indication that could indicate a fire, or possible fire. Also, there could be a textual indication of what the detection indicia indicates 325. Any of the graphic depictions could be shown with textual information that can assist in swiftly interpreting the diagram.

Figure 4:
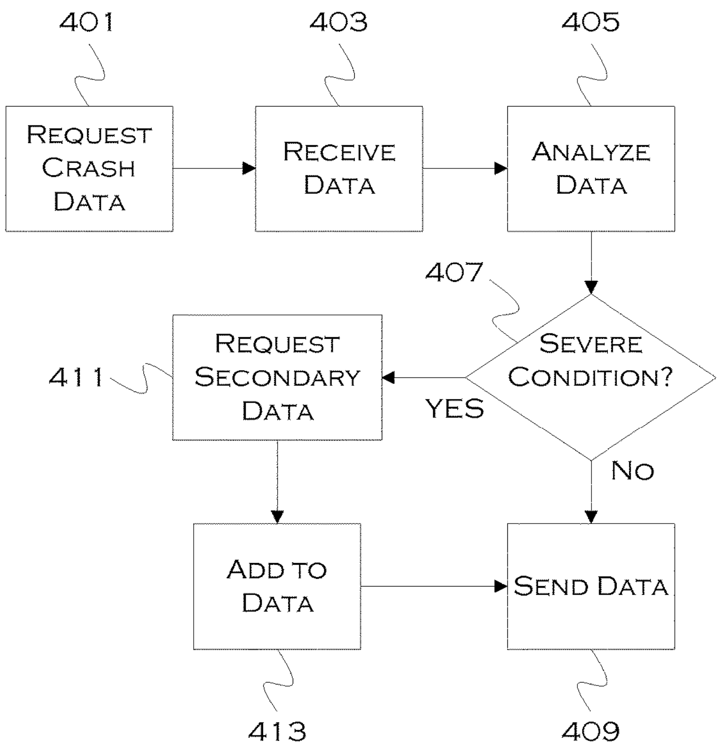
FIG. 4 shows an illustrative example of crash data gathering.

FIG. 4 shows an illustrative example of crash data gathering. In this illustrative example, the process requests crash data from any number of vehicle sensors and/or a restraint control module or other modules 401. The data is then received from the available modules/sensors 403 and analyzed by the process 405. In this example, the data may be analyzed, for example, to determine if a severe condition exists 407.

Severe conditions can include, for example, a high impact, fuel leaking, passengers left seats on impact, or other conditions that may require an advanced emergency response. Determination of a severe condition can lead the process to request secondary data 411. Secondary data can include, for example, interior camera photos, heat detectors, rollover detection, damaged door opening detection (e.g., the occupants cannot exit the vehicle), or any other indication that may be useful to emergency crews for providing specific response to detected conditions. For example, detection of a fuel leak and/or a fire may cause the responders to request fire/rescue dispatch to the accident scene.

Any secondary information that is obtained as a result of the query can be added to the visual data to be sent to the emergency responder 413. Data, augmented by secondary data or otherwise, can then be sent to the emergency responder and/or ICE contacts or other emergency contacts 409.

The data related to exacerbated crash conditions can be included in a graphical representation of the vehicle. Further indicia of an exacerbated condition can be include, such as, for example, flames, flashing graphics or text, or other graphical indications intended to draw the eye.

Figure 5:
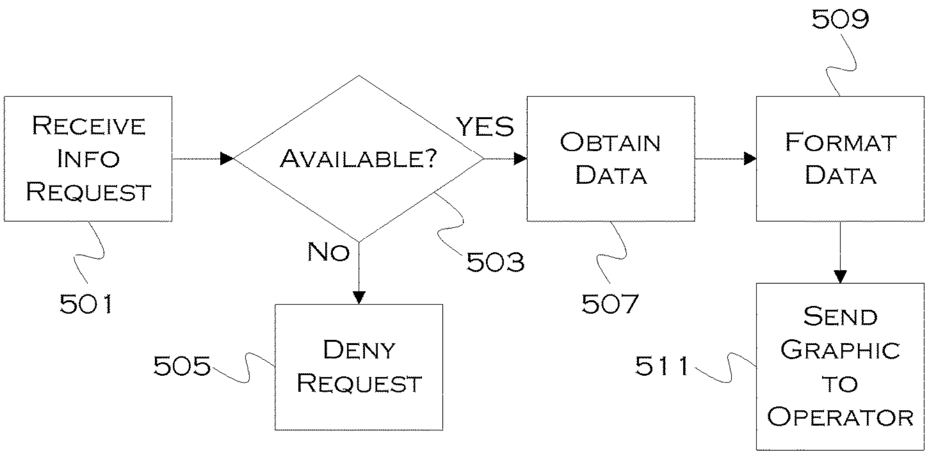
FIG. 5 shows an illustrative example of data request handling.

FIG. 5 shows an illustrative example of data request handling. In this illustrative example, a remote emergency operator is capable of requesting additional data relating to the accident. In this form, the additional data request includes a request for a graphic representation of the accident. Initial crash data or a crash indication has already been sent, in this example.

The process receives a request from the emergency operator for the advanced accident information 501. The process then determines if this information is available 503. The information may not be available, for example, because sensors may have been damaged or the vehicle may not be equipped with graphic delivery capability.

In this example, if the information is not available, the process may respond to the request with a denial of the request, so that the operator knows that the request is not simply still pending 505. Otherwise, the process may obtain the requisite data 507, format the data 509, and deliver the graphic representation to the emergency operator 511.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:

a processor configured to:

request vehicle sensor data upon crash detection;

assemble the data into a graphic representation of a vehicle, including graphic representations of conditions represented by sensor data overlaid onto the vehicle representation to visually demonstrate current vehicle conditions; and send the graphic representation to an emergency operator in communication with a vehicle computing system.

2. The system of claim 1, wherein the conditions include airbag deployment.

3. The system of claim 1, wherein the conditions include fuel leakage.

4. The system of claim 1, wherein the conditions include seatbelt status.

5. The system of claim 1, wherein the conditions include occupancy information.

6. The system of claim 1, wherein the conditions include crash severity.

7. The system of claim 1, wherein the conditions include direction of impact.

8. The system of claim 1, wherein the conditions include whether occupants remain in their respective seats.

9. The system of claim 1, wherein the graphic representation is sent via text message.

10. The system of claim 1, wherein the graphic representation is sent via email.

11. A computer implemented method comprising:

requesting vehicle sensor data upon crash detection;

assembling the data into a graphic representation of a vehicle, including graphic representations of conditions represented by sensor data overlaid onto the vehicle representation to visually demonstrate current vehicle conditions; and sending the graphic representation to an emergency operator in communication with a vehicle computing system.

12. The method of claim 11, wherein the conditions include airbag deployment.

13. The method of claim 11, wherein the conditions include fuel leakage.

14. The method of claim 11, wherein the conditions include seatbelt status.

15. The method of claim 11, wherein the conditions include occupancy information.

16. The method of claim 11, wherein the conditions include crash severity.

17. The method of claim 11, wherein the conditions include direction of impact.

18. The method of claim 11, wherein the conditions include whether occupants remain in their respective seats.

19. The method of claim 11, wherein the graphic representation is sent via text message.

20. The method of claim 11, wherein the graphic representation is sent via email.

21. A system comprising:

a processor configured to:

gather crash-related vehicle data;

assemble the crash-related data into a graphical representation of a vehicle;

determine exacerbated crash conditions, which may require specialized emergency services, from the gathered crash-related data;

request additional data related to any exacerbated crash conditions; and incorporate the additional data into the graphical representation, including a graphical indicia indicating the presence of an exacerbated condition.

* * * * *